UNITED STATES PATENT OFFICE.

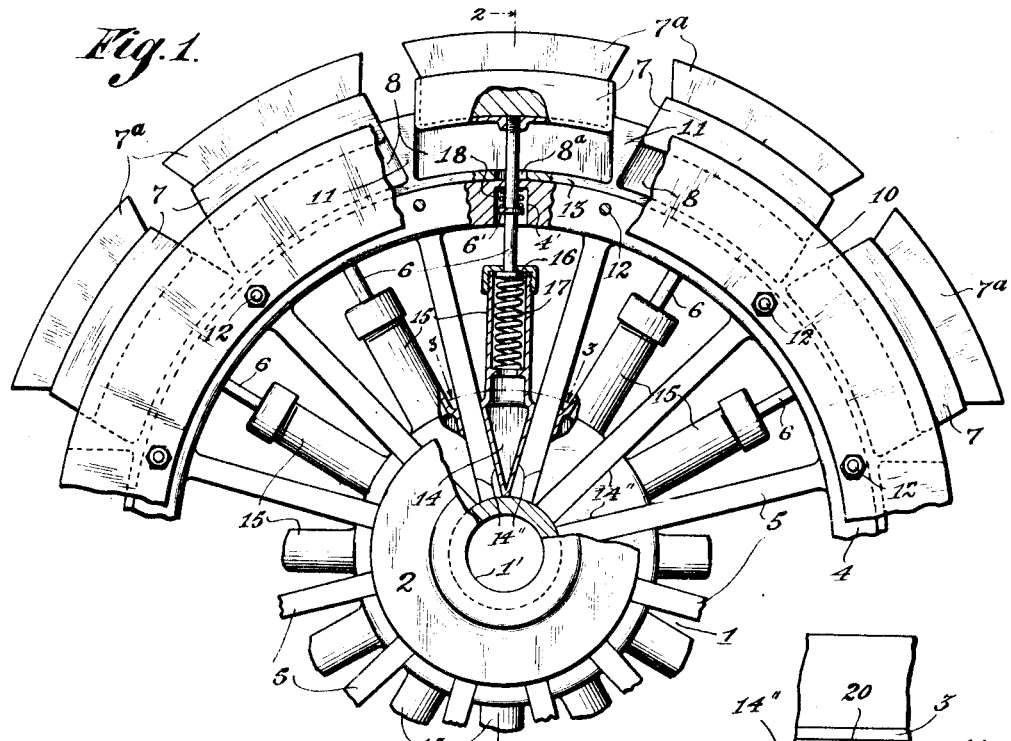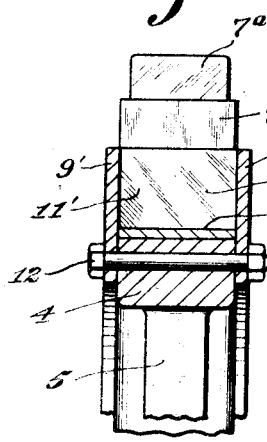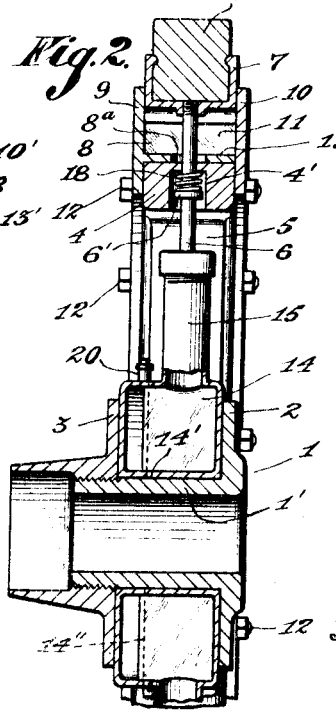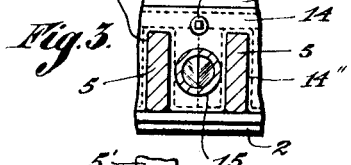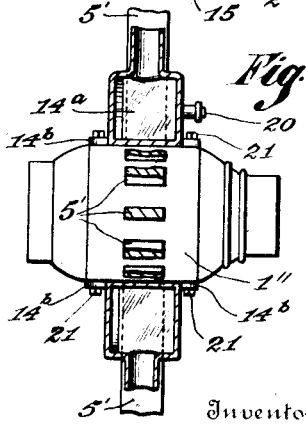

MORRIS B. OKUN, OF SEATTLE, WASHINGTON.

WHEEL.

1,058,998.

Specification of Letters Patent.  Patented Apr. 15, 1913.

Application filed April 11, 1912. Serial No. 690,208.

*To all whom it may concern:*

Be it known that I, MORRIS B. OKUN, a citizen of the United States of America, and a resident of the city of Seattle, in the county of King and State of Washington, have invented certain new and useful Improvements in Wheels, of which the following is a specification.

My invention has particular reference to a self cushioning wheel embodying a tread portion formed of sections arranged end to end circumferentially of the wheel and yieldingly supported for independent inward movement to obtain a desired cushioning effect, and has for a primary object the provision of a simplified and improved construction of this character which is durable, comparatively inexpensive to manufacture and capable of being readily set up.

Other objects will be set forth as my description progresses and those features of construction, arrangements and combinations of parts on which I desire protection, succinctly defined in my annexed claims.

Referring to the accompanying drawings, wherein like numerals of reference indicate like parts throughout: Figure 1 is a fragmentary elevation of the wheel, as viewed from the inner side, parts being broken away. Fig. 2 is a fragmentary vertical section of the wheel taken on line 2—2 of Fig. 1. Fig. 3 is a horizontal section taken on line 3—3 of Fig. 1 and illustrating more particularly my chamber for the fluid. Fig. 4 is a vertical sectional view showing a modified construction, and Fig. 5 is a fragmentary vertical section illustrating more particularly my fluid chamber in modified arrangement.

Referring to the drawing by numerals of reference 1 indicates a hub, the axle box 1' of which is provided with annular external flanges 2 and 3, the latter of which has screw-threaded engagement on the outer end portion of axle box 1' as clearly shown in Fig. 2.

Reference numeral 4 indicates a felly, and 5 spokes, the said felly being formed with apertures 4' between the spokes 5 for reception of stems 6. Stems 6 have their outer end portions externally threaded and engaged in boxes 7 which boxes carry the tread parts 7ᵃ and formed in conjunction therewith, what I term, " tread sections " for the wheel. These tread sections are guided in chambers 8, opposite side faces of the boxes 7 being parallel and snugly engaging the opposing faces of the related chambers 8 so as to be firmly guided during their radial movement and further, to obtain a cushioning effect through the compression of air in the chambers incident to the inward movement of the tread sections. Chambers 8 are formed by edge flanges 9 and 10 of felly 4, and intermediate partitions 11. In the construction shown in Figs. 1 and 2 flanges 9 and 10 are in the form of annular plates, bolted, as at 12, to the felly, and said flange 9 is provided with the partitions 11, and a connecting flange 13 adapted to seat on felly 4 to form the bottom walls of chambers 8.

In the construction shown in Fig. 4 the bottom walls for the chambers 8 are formed by a member 13' which may be the usual metal tire of a solid wooden wheel. Plates 9', 10' abut member 13' and said plate 9' is provided with angular extensions 11' to provide partitions, as in the first described form of my invention. Reference numeral 14 indicates the fluid chamber, the same being provided with a central opening 14' for reception of the axle box 1', and in its inner side face with seats 14'' for reception of spokes 5. Reference numeral 15 indicates radially disposed cylindrical extensions of chamber 14 in which plungers 16, fixed to stems 6 are mounted. Beneath plungers 16 are provided springs 17 which act in conjunction with the compressed fluid of chamber 14 to force the tread sections outwardly to their normal positions. Springs 18, encircling stems 6 and interposed between collars 6' of the latter, and felly 4, as clearly shown in Figs. 1 and 2, cushion the outward movements of the tread sections, as is apparent.

In practice, I preferably employ air under pressure in the chamber 14, the air being supplied through a valved connection 20 by a suitable pump, as will be readily understood. Through the provision of chambers 8 and the boxes 7, in the manner hereinbefore described, liability of injury to the stems 6 is reduced to a minimum and further auxiliary air cushions are obtained.

My invention can be applied to standard or other suitable wooden or iron wheels, the only change necessitated being the forming of the felly with the apertures 4' with which suitable apertures 8ᵃ of chambers 8 register for reception of the stems 6 and also to permit of the ingress and egress of air with respect to the chambers. By forming chamber 14 in the manner described it can be readily inserted over the axle box 1' of hub 1 to fit snugly about spokes 5.

In the construction shown in Fig. 5, chamber 14ª is provided with apertured lugs 14ᵇ through which securing means, as screws 21 are passed for securing the chamber to the hub 1''. In this construction the chamber 14ª is formed with seats for the spokes 5', as in my first described construction.

Having thus described my invention what I claim as new, and desire to secure by Letters Patent of the United States of America, is:—

1. A wheel comprising a hub, a felly, spokes connecting said felly to said hub, a fluid chamber seated on said hub and formed with recesses to receive said spokes, the said recesses of said chamber extending inwardly from one side thereof, said fluid chamber being provided with hollow radial extensions lying between the said spokes, plungers slidably mounted in the radial extensions of said fluid chamber, and having stems projecting through said felly, and tread sections arranged end to end in outwardly spaced relation to said felly and each secured to the stem of a respective plunger.

2. A wheel comprising a hub, a felly, spokes connecting said felly to said hub, a fluid chamber removably seated on said hub and engaging between said spokes and provided with radial extensions, plungers slidably mounted in the extensions of said fluid chamber, stems secured to said plungers and projecting through said felly, guides removably secured to said felly, and tread sections slidably fitted between said guides and each secured to a respective stem.

3. In a wheel construction, a felly provided with apertures spaced lengthwise thereof, a fluid chamber arranged inwardly of said felly and provided with hollow radial extensions, means for holding said chamber in rigid relation to said felly, plungers mounted in the extensions of said chamber and having stems projecting through the apertures of said felly, tread sections secured to the outer end portions of the stems of said plungers, resilient means comprising springs in the extensions of said chamber beneath said plungers tending to force the latter toward said felly, and other resilient means for cushioning outward movement of said plungers.

Signed at Seattle, Washington, this 3rd day of April, 1912.

MORRIS B. OKUN.

Witnesses:
STEPHEN A. BROOKS,
ARLITA ADAMS.